S. K. IVERSON.
SPRAYING ATTACHMENT.
APPLICATION FILED MAY 23, 1913. RENEWED DEC. 5, 1914.

1,144,204. Patented June 22, 1915.
2 SHEETS—SHEET 1.

Witnesses
Inventor
S. K. Iverson
By
Attorneys

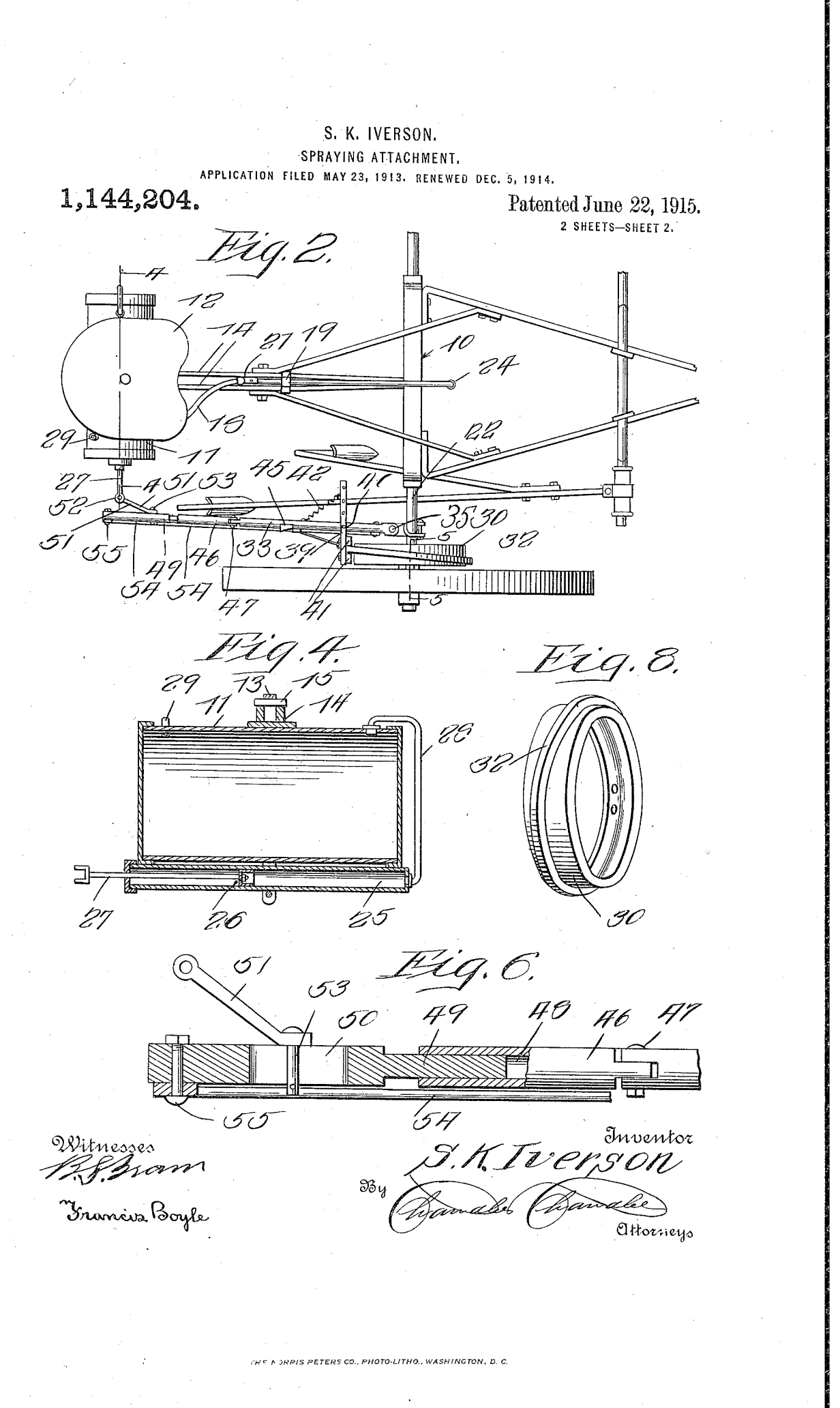

S. K. IVERSON.
SPRAYING ATTACHMENT.
APPLICATION FILED MAY 23, 1913. RENEWED DEC. 5, 1914.

1,144,204.                                    Patented June 22, 1915.
                                                    2 SHEETS—SHEET 2.

UNITED STATES PATENT OFFICE.

SAM K. IVERSON, OF COLFAX, WISCONSIN.

SPRAYING ATTACHMENT.

1,144,204.  Specification of Letters Patent.  Patented June 22, 1915.

Application filed May 23, 1913, Serial No. 769,528. Renewed December 5, 1914. Serial No. 875,741.

*To all whom it may concern:*

Be it known that I, SAM K. IVERSON, a citizen of the United States, residing at Colfax, in the county of Dunn, State of Wisconsin, have invented certain new and useful Improvements in Spraying Attachments; and I do hereby declare the following to be a full, clear, and exact description of the invention, such as will enable others skilled in the art to which it appertains to make and use the same.

This invention relates to spraying attachments for cultivators and has for an object to provide means for supplying a spray of insect poisoning fluid to plants being cultivated, at the will of the operator.

A further object is to provide a fluid reservoir having novel air compressing means actuated by one of the cultivator ground wheels or the axle, for feeding the insecticide under pressure through the spray nozzle.

A further object is to provide an extremely simple and inexpensive apparatus of this character which may be applied to all ordinary cultivators and which will be compact in form and inconspicuous, and which will be light, strong and durable and will consist of a few parts that will not easily get out of order.

With the above objects in view the invention consists of certain novel details of construction and combination of parts hereinafter fully described and claimed, it being understood that various modifications may be made in the minor details of construction within the scope of the appended claims.

Figure 1:
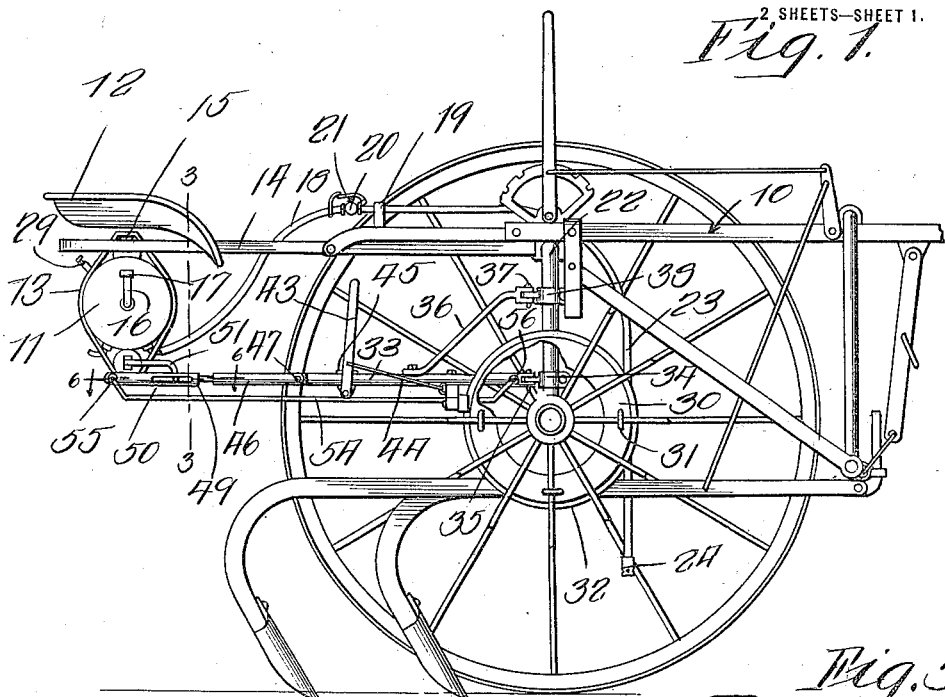
Figures 3, 5:
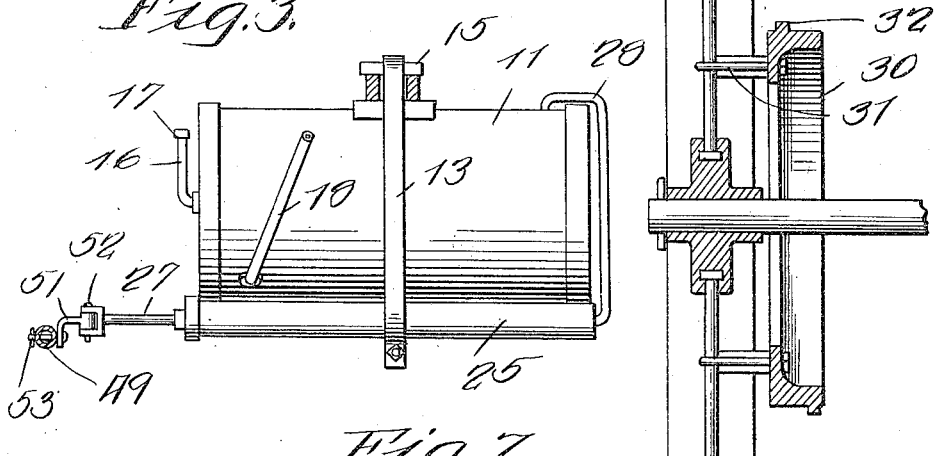
Figure 7:
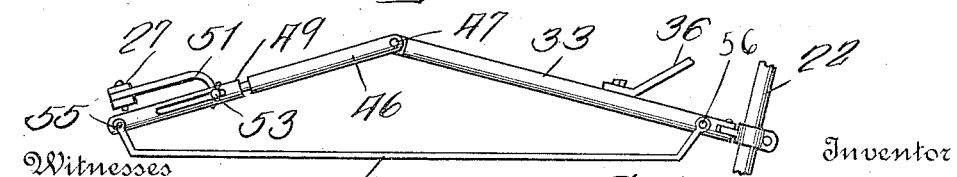

In the accompanying drawings illustrating this invention: Figure 1 is a side elevation of a cultivator equipped with my invention. Fig. 2 is a plan view. Fig. 3 is a cross sectional view on the line 3—3 Fig. 1 with parts removed. Fig. 4 is a cross sectional view on the line 4—4 Fig. 2. Fig. 5 is a cross sectional view on the line 5—5 Fig. 2. Fig. 6 is a detail longitudinal sectional view on the line 6—6 Fig. 1. Fig. 7 is a side elevation showing the pump actuating rod in the position it assumes to accommodate tilting forward of the axle. Fig. 8 is a detail perspective view of the cam wheel.

Referring now to the drawings in which like characters of reference designate similar parts, 10 designates in general an ordinary cultivator.

The spraying attachment comprises a reservoir 11 which is suspended underneath the cultivator seat 12 by means of a strap 13 which passes through a bifurcation in the seat supporting rod 14 of the cultivator and straddles a block 15 disposed on the top edge of the rod. The reservoir is equipped in one head with a filling pipe 16 which is closed by a cap 17, the liquid supply in the reservoir being replenished through this pipe. The reservoir is equipped in the bottom with an outlet pipe 18 that is carried upwardly adjacent to the front of the seat and there supported by means of a bracket 19 secured to the cultivator frame, the pipe being at this point equipped with a valve 20 which is controlled by a lever 21 disposed within convenient reach of the operator. The pipe is then led forwardly to a point in advance of the cultivator axle 22, and from this point directly downwardly as shown at 23 and terminally equipped with a spray nozzle 24 that is arranged midway between the ground wheels of the cultivator and slightly above the treads of the wheels.

For supplying the liquid from the reservoir under pressure, a pump cylinder 25 is disposed on the bottom of the reservoir and within this cylinder works a pump piston 26 that is equipped with a piston rod 27 which projects through one end of the pump cylinder, there being an air pipe 28 communicating with the opposite end of the pump cylinder and entering the top of the reservoir. A safety valve 29 is disposed on the top of the reservoir which valve opens under excess pressure in the reservoir. For actuating the pump piston I provide a wheel 30 that is disposed on the cultivator axle near one of the ground wheels and is secured for turning with said ground wheel by means of U-bolts 31, the wheel being equipped on the periphery with a spiral cam rib 32. A rod 33 is pivoted to swing in a horizontal plane on a coupling 34 attached to the upright portion of the axle 22 next adjacent to the cam wheel 30, by means of a vertical pivot pin 35, this rod being braced by an upwardly inclined brace 36 which is hinged on a vertical pivot pin 37 that is in vertical alinement with the pivot pin 35 and is carried by a coupling 38 secured to the upright portion of the axle 22 as best shown in Fig. 1.

A cross arm 39 is pivotally connected by a bolt 40 to the rod 33 and is terminally equipped with spaced rollers 41 which ride on the sides of the cam rib 32, and upon rotation of the cam wheel by the adjacent ground wheel of the harrow, the cross arm rocks the rod 33 horizontally. The cross arm is normally held in operative position by means of a helical spring 42 attached to the rod 33 and to the opposite end of the cross arm from the rollers. For disconnecting the cross arm from the cam wheel 30 a lever 43 is pivoted on the rod 33 and is connected by a link 44 to the cross arm adjacent to the rollers, there being a catch lug 45 on the side of the rod 33 over which the lever may be rocked rearwardly and engaged in rear thereof to withdraw the cross arm and hold the same disengaged from the cam wheel.

The rod 33 is so connected to the pump piston that upon the cultivator axle 22 being tilted forwardly in the usual manner to raise or lower the cultivator main frame and thereby vary the depth of cut of the cultivator blades, the rod will still effectively perform its function in reciprocating the pump piston, and to attain this end the following mechanism is employed: A link 46 is hinged to the rod 43 by means of a horizontal pivot 47 and is provided with a bore 48 into which a second link 49 telescopingly fits, the link 49 being provided with a longitudinal slot 50. A connecting link 51 is pivotally connected to the piston rod 27 as shown at 52 and is equipped with a pin 53 which fits in the slot 50 of the link 49. A straight rod 54 is pivotally connected as shown at 55 to the free end of the link 49 and is also pivotally connected as shown at 56 to the rod 33 near its vertical pivot 35. Now when the axle is tilted forwardly the hinged ends of the rod 33 and link 46 rise vertically as shown in Fig. 7, the link 46 moving outwardly from the link 49 to permit of this movement. By virtue of the pivotal connections between the ends of the rod 54 and the rod 33 and link 49, the rod 33 and link 49 are permitted to move as above described while, the length of the rod 54 remaining constant, a constant distance is maintained between the connecting pin 53 of the pump piston and forward end of the rod 54 in a straight line whereby the actuation of the pump piston is continued regardless of the tilted position assumed by the axle.

In operation the cultivator is drawn along over the rows of plants in the usual manner with a resultant actuating of the pump and resultant charging of the tank with air, the pressure of which is regulated by the release valve 29. When it is desired to spray the plants to kill insects thereon, the operator simply presses the valve lever 21 to open the valve. The poison fluid is then discharged under pressure through the spray nozzle and thoroughly sprays the desired plant.

What is claimed, is:—

1. The combination with an air pump of a swinging rod connected to the pump piston, the said rod including a jointed portion and a reach bar bridging the jointed portion and connecting the ends thereof, a pivot at an extremity of the rod, a cross bar on the rod near said pivot, and a cam operatively engaging the bar.

2. The combination with an air pump, a horizontally swinging rod connected to the pump piston for operating said piston, said rod comprising a jointed portion and a reach bar bridging the joint of and connecting the ends of said jointed portion, a vertical pivot for one end of said rod, a cross bar on said rod near said pivot, and a cam operatively engaging said bar for shifting the latter back and forth horizontally to swing said rod horizontally.

In testimony whereof, I affix my signature, in the presence of two witnesses.

SAM K. IVERSON.

Witnesses:
ANNA O. WIKE,
LULA M. THOMPSON.

Copies of this patent may be obtained for five cents each, by addressing the "Commissioner of Patents, Washington, D. C."